United States Patent
Guerrero et al.

(10) Patent No.: US 9,862,350 B2
(45) Date of Patent: Jan. 9, 2018

(54) DUAL CHAMBERED PASSENGER AIRBAG

(71) Applicant: TK Holdings Inc., Auburn Hills, MI (US)

(72) Inventors: Michael D. Guerrero, Ann Arbor, MI (US); Jaime F. Perez, Lake Orion, MI (US); Vivek Maripudi, Bloomfield Hills, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 14/458,153

(22) Filed: Aug. 12, 2014

(65) Prior Publication Data
US 2015/0042080 A1 Feb. 12, 2015

Related U.S. Application Data

(60) Provisional application No. 61/865,095, filed on Aug. 12, 2013.

(51) Int. Cl.
*B60R 21/233* (2006.01)
*B60R 21/2334* (2011.01)
*B60R 21/239* (2006.01)

(52) U.S. Cl.
CPC ........ *B60R 21/233* (2013.01); *B60R 21/2334* (2013.01); *B60R 21/239* (2013.01); *B60R 2021/23308* (2013.01); *B60R 2021/23316* (2013.01); *B60R 2021/23324* (2013.01)

(58) Field of Classification Search
CPC ... B60R 21/23; B60R 21/233; B60R 21/2334; B60R 21/239; B60R 2021/23316; B60R 2021/23324
See application file for complete search history.

(56) References Cited

U.S. PATENT DOCUMENTS

| | | | |
|---|---|---|---|
| 5,536,038 A * | 7/1996 | Bollaert et al. | 280/730.2 |
| 5,586,782 A * | 12/1996 | Zimmerman et al. | 280/730.2 |
| 5,593,179 A * | 1/1997 | Maruyama | 280/740 |
| 5,599,041 A * | 2/1997 | Turnbull et al. | 280/729 |
| 5,697,641 A * | 12/1997 | McGee et al. | 280/743.1 |
| 5,853,191 A * | 12/1998 | Lachat | 280/730.2 |
| 6,059,312 A * | 5/2000 | Staub et al. | 280/729 |
| 6,062,594 A * | 5/2000 | Asano et al. | 280/730.2 |
| 6,270,113 B1 * | 8/2001 | Wipasuramonton et al. | 280/730.2 |
| 6,361,067 B1 * | 3/2002 | Varcus et al. | 280/729 |
| 6,402,190 B1 * | 6/2002 | Heudorfer et al. | 280/729 |
| 6,439,605 B2 | 8/2002 | Ariyoshi | |

(Continued)

OTHER PUBLICATIONS

Office Action, dated Aug. 28, 2017, received in connection with JP Patent Application No. 2016-533502 (English-language translation attached).

*Primary Examiner* — Barry Gooden, Jr.
(74) *Attorney, Agent, or Firm* — Meunier Carlin & Curfman LLC

(57) ABSTRACT

An airbag includes an outer shell defining an interior of the airbag, and a divider positioned in the interior so as to divide the interior into a first chamber and a second chamber. The divider includes a body portion and at least one flap attached to the body portion along an edge. The divider is attached to the outer shell so as to form a gas-tight seal between the outer shell and the body portion and so as to form a gas flow passage between the at least one flap and the outer shell.

14 Claims, 13 Drawing Sheets

(56) References Cited

U.S. PATENT DOCUMENTS

| | | | |
|---|---|---|---|
| 6,471,239 B1* | 10/2002 | Nishijima et al. | 280/729 |
| 6,471,244 B1* | 10/2002 | Nishijima et al. | 280/742 |
| 7,059,634 B2 | 6/2006 | Bossecker et al. | |
| 7,543,849 B2* | 6/2009 | Bradburn | 280/739 |
| 7,543,850 B2 | 6/2009 | Bachraty et al. | |
| 7,731,232 B2 | 6/2010 | Higuchi | |
| 7,862,082 B2* | 1/2011 | Thomas | 280/740 |
| 8,500,159 B2* | 8/2013 | Feller et al. | 280/729 |
| 8,746,734 B1* | 6/2014 | Smith et al. | 280/730.2 |
| 8,925,962 B2* | 1/2015 | Yamada | 280/731 |
| 2001/0003395 A1* | 6/2001 | Ariyoshi | 280/729 |
| 2003/0151233 A1* | 8/2003 | Varcus | 280/729 |
| 2006/0175809 A1* | 8/2006 | Yamaji et al. | 280/729 |
| 2006/0237953 A1* | 10/2006 | Abe | 280/729 |
| 2007/0052222 A1* | 3/2007 | Higuchi et al. | 280/738 |
| 2007/0170710 A1* | 7/2007 | Bouquier | 280/739 |
| 2008/0143086 A1* | 6/2008 | Higuchi | 280/736 |
| 2008/0179867 A1 | 7/2008 | Riedel et al. | |
| 2009/0152846 A1* | 6/2009 | Choi | B60R 21/233 280/729 |
| 2009/0224520 A1* | 9/2009 | Higuchi | 280/740 |
| 2010/0045006 A1* | 2/2010 | Thomas | 280/732 |
| 2011/0248487 A1* | 10/2011 | Burczyk et al. | 280/742 |
| 2012/0112441 A1* | 5/2012 | Ohara | 280/729 |
| 2012/0248746 A1* | 10/2012 | Yamamoto | 280/729 |
| 2013/0133971 A1* | 5/2013 | Rick | 180/274 |
| 2013/0221645 A1* | 8/2013 | Yamada | 280/742 |
| 2014/0203542 A1* | 7/2014 | Fukawatase et al. | 280/730.2 |
| 2014/0225354 A1* | 8/2014 | Williams et al. | 280/743.1 |
| 2014/0265277 A1* | 9/2014 | Iida et al. | 280/743.1 |
| 2014/0306433 A1* | 10/2014 | Anderson et al. | 280/729 |
| 2015/0035263 A1* | 2/2015 | Guerrero et al. | 280/729 |

\* cited by examiner

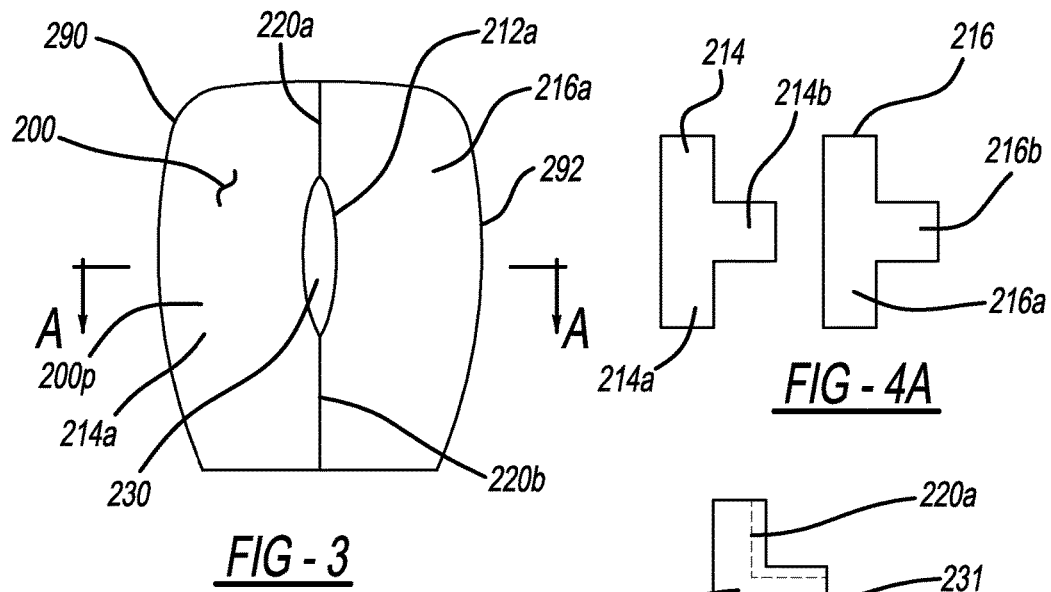
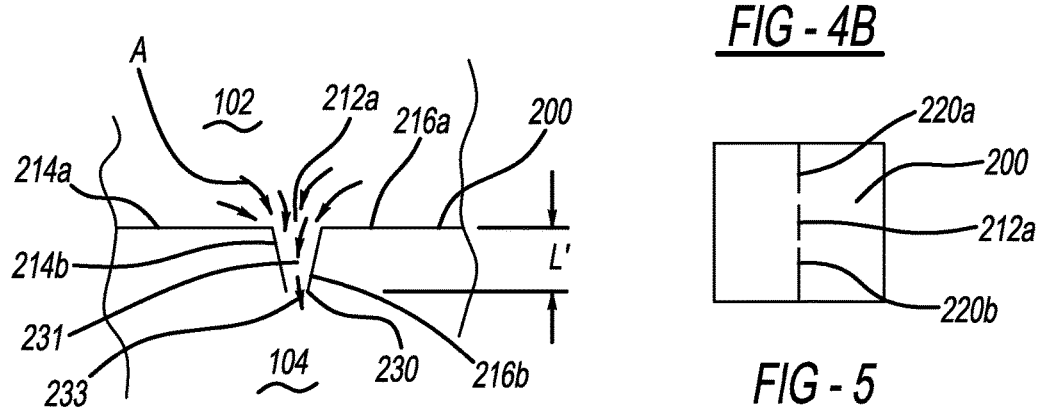
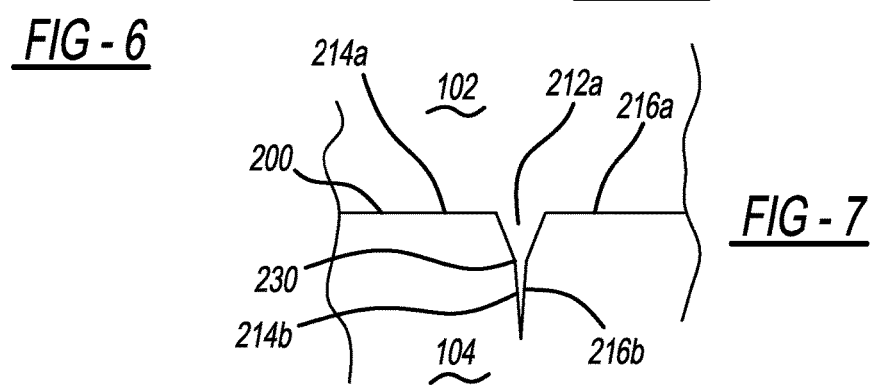

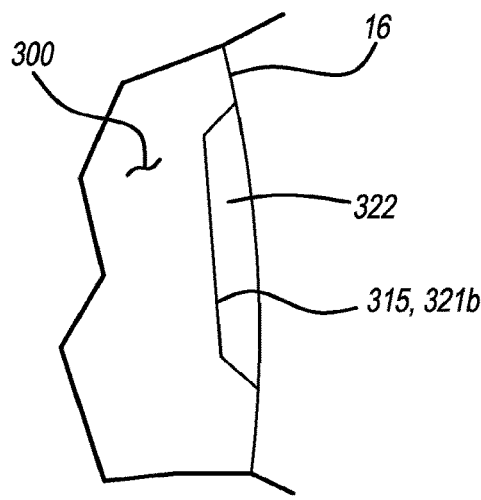
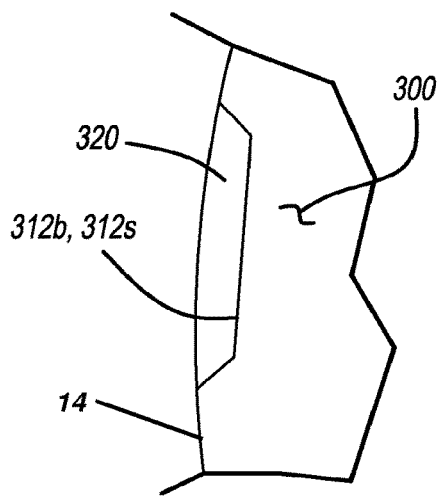
FIG - 16
FIG - 17
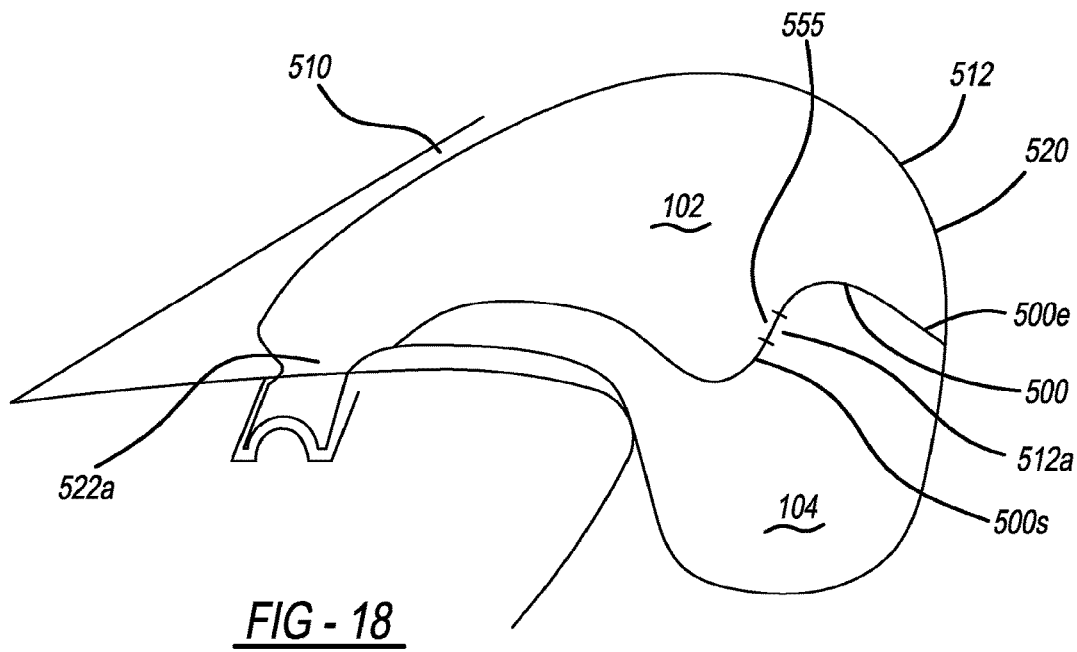
FIG - 18

DUAL CHAMBERED PASSENGER AIRBAG

CROSS-REFERENCE TO RELATED APPLICATIONS

This application claims the benefit of U.S. Provisional Application Ser. No. 61/865,095, filed on Aug. 12, 2014, the disclosure of which is hereby incorporated by reference in its entirety.

BACKGROUND OF THE INVENTION

The embodiments described herein relate to a passenger airbag, which is filled with gas during an emergency situation such as, for example, a frontal or side impact. More particularly, the embodiments described herein relate to a passenger airbag incorporating a divider which separates an interior of the airbag into a plurality of chambers, and an inter-chamber venting system for controlling gas flow between the chambers.

Upon activation of a vehicle airbag system, an inflation gas typically enters a first chamber of a vehicle passenger airbag, then proceeds into one or more additional chambers which are in fluid communication with the first chamber. In certain scenarios, it is desirable to restrict backflow of gases from a second chamber into the first chamber from which the second chamber was filled. This aids in maintaining pressure in the second chamber during passenger contact with the portion of the airbag exterior of the second chamber, thereby helping to cushion the passenger for a relatively longer period of time. The gas flow control mechanism should enable rapid filling of the second chamber (and any other chambers) from the first chamber. In addition, in order to maintain pressure in the second chamber, the gas flow control mechanism should also rapidly respond to a gas backflow condition or reverse pressure differential tending to force gases back into the first chamber, by acting to restrict the backflow to the desired degree.

In view of these requirements, an ongoing need exists for improved methods and mechanisms for controlling gas flow between the chambers of an airbag.

SUMMARY OF THE INVENTION

In one aspect of the embodiments described herein, an airbag is provided. The airbag includes an outer shell defining an interior of the airbag, and a divider positioned in the interior so as to divide the interior into a first chamber and a second chamber. The divider includes a body portion and at least one flap attached to the body portion along an edge. The divider is attached to the outer shell so as to form a gas-tight seal between the outer shell and the body portion and so as to form a gas flow passage between the at least one flap and the outer shell.

In another aspect of the embodiments of the described herein, a divider for an airbag is provided. The divider includes a body portion having a first side, a second side opposite the first side, and an opening enabling fluid communication between the first and second sides. A hollow member surrounds the opening and is secured to the body portion so as to form a gas-tight seal between the member and the body portion. The member is structured such that walls of the member are forced apart to enable a transfer gases from the first side through the member to the second side, responsive to a pressure differential wherein a pressure on the first side is greater than a pressure on the second side. The member is also structured such that walls of the member are forced into contact with each other so as to restrict a transfer gases from the second side through the member to the first side, responsive to a pressure differential wherein the pressure on the second side is greater than the pressure on the first side.

BRIEF DESCRIPTION OF THE DRAWINGS

FIG. 3 is a schematic plan view of an alternative embodiment of a divider attachable to the interior of an airbag.

FIG. 4A is an exploded view of the divider embodiment shown in FIG. 3.

FIG. 4B is a side view of the divider embodiment shown in FIGS. 3 and 4A in an assembled condition.

FIG. 5 is another schematic plan view of the divider embodiment shown in FIG. 3.

FIG. 6 is a side schematic view of the divider and valve shown in FIGS. 3-5 with the valve shown in an open condition.

FIG. 7 is a side schematic view of the divider and valve shown in FIGS. 3-5 with the valve shown in a closed condition.

FIG. 16 is a magnified view of a portion of the cross-section shown in FIG. 14.

FIG. 17 is a cross-sectional plan view of portion of a passenger-side airbag (in an inflated state) incorporating an airbag divider and multiple flow control valve mechanisms in accordance with another alternative embodiment described herein.

FIG. 18 is a side cross-sectional view of a passenger-side airbag (in an inflated state) incorporating an airbag divider and at least one flow control valve in accordance with another alternative embodiment described herein.

DETAILED DESCRIPTION

Figure 1:
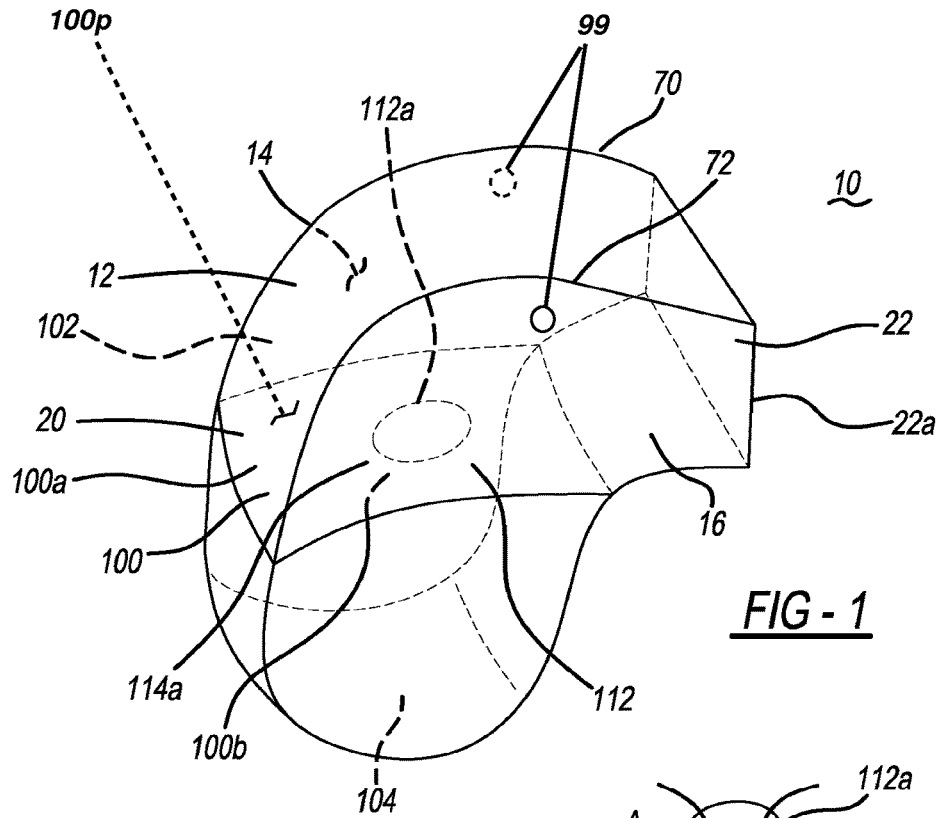
FIG. 1 is a schematic perspective view of a passenger-side airbag (in an inflated state) incorporating an airbag divider and a flow control valve mechanism in accordance with an embodiment described herein.

Like reference numerals refer to like parts throughout the description of several views of the drawings. In addition, while target values are recited for the dimensions of the various features described herein, it is understood that these values may vary slightly due to such factors as manufacturing tolerances, and also that such variations are within the contemplated scope of the embodiments described herein.

Embodiments of the present invention will be described below with reference to the drawings. One of ordinary skill in the art will appreciate the various aspects of airbag design, construction and operation applicable to the embodiments of the present invention described herein. U.S. Pat. Nos. 6,886,857, 7,857,347, 8,128,124, and 8,322,748, for example, describe many such aspects and are incorporated herein by reference in their entirety, but not by way of limitation.

FIG. 1 is a view of one embodiment of a passenger-side airbag 10 (in an inflated state). The airbag embodiment shown in FIG. 1 has an outer shell formed from three panels which combine to define an interior of the airbag. Specifically, the airbag is formed of a main panel 12, a right side (when viewing the airbag from a seated position) panel 16, and a left side panel 14 opposite the right side panel 16. Each of the side panels 14, 16 is generally planar (when the airbag 10 is inflated). The main panel 12 connects the left and right panels and wraps around the airbag 10. As a result, the entirety of the right edge of the main panel 12 is connected along a seam 72 (e.g., by stitching, sewing, adhesive attachment or other suitable means) to the right panel 16 and the entirety of the left edge of the main panel 12 is connected along a seam 70 (e.g., by stitching, sewing, or other suitable means) to the left panel 14.

The main panel 12 has both a front impact side 20 and a rear inflation side 22. Side panels 14 and 16 and main panel 12 also combine to define a mouth 22a of the airbag through which gas is injected into the airbag. After wrapping around the airbag 10, ends of the main panel 12 are joined at the rear inflation side. In addition, the rear inflation side 22 has slits (not shown) which are sized to receive an inflator (not shown), and may also include holes (not shown) which are sized to receive bolts (or other suitable fasteners) that are configured to secure the airbag 10 to the body of an automobile (or other device). Portions of one or more of panels 12, 14, 16 defining an upper chamber 102 (described in greater detail below) may also incorporate one or more vents 99 therein to release gas from the upper chamber in a controlled manner during contact between a passenger and the airbag.

Figure 2:
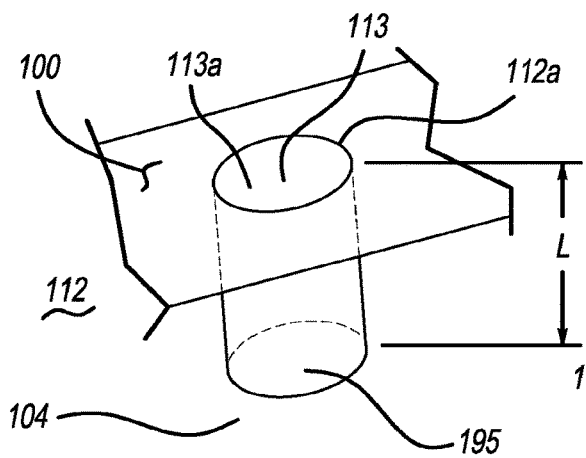
FIG. 2 is a perspective view of a portion of the airbag of FIG. 1 showing an airbag internal divider incorporating a valve mechanism in accordance with an embodiment described herein.

Referring to FIGS. 1 and 2, a divider 100 is stitched or otherwise suitably attached along a perimeter thereof to interior surfaces of the main, left and right airbag panels. The divider 100 has a body portion 100p including a first side 100a and a second side 100b opposite the first side. The divider 100 is attached to the panel interior surfaces so as to form a gas-tight seal between the divider and the panels to which it is attached. Divider 100 divides the airbag interior into a first or upper chamber 102 and a second or lower chamber 104. Panels 12, 14 and 16 and divider 100 may be formed in a known manner from gas-impermeable fabric(s) or other suitable gas-impermeable material(s).

In the embodiments described herein, the airbag is structured to fill by receiving inflation gas into the upper chamber 102. A portion of this gas is then transferred to the lower chamber 104. Thus, the upper chamber 102 becomes a relatively higher pressure region of the airbag, while the lower chamber 104 is a relatively lower pressure region. In alternative embodiments, the airbag may be structured to fill by receiving inflation gas into the lower chamber 104. A portion of this gas is then transferred to the upper chamber 102 to complete inflation of the airbag. Thus, in these embodiments, the lower chamber 104 becomes the relatively higher pressure region of the airbag, while the upper chamber 102 is the relatively lower pressure region.

An inter-chamber venting system is provided to permit gas to flow from the relatively higher pressure chamber (in this embodiment, upper chamber 102) into the relatively lower pressure chamber (in this embodiment, lower chamber 104), and also to restrict backflow from the lower chamber 104 into the upper chamber 102. In one embodiment, the inter-chamber venting system is in the form of a valve mechanism 112 (shown schematically in FIGS. 1 and 2) incorporated into or operatively coupled to the divider 100 for controlling gas flow between the upper and lower chambers. Valve 112 may have any of a number of structures suitable for controlling gas flow in the airbag interior, in the manner described herein.

The gas flow rate from the upper chamber 102 into the lower chamber 104 may be controlled by controlling the dimensions of opening 112a and the valve structure and dimensions. In the embodiments described herein, the valve is a one-way or non-return valve structured to restrict a return flow of gases from the lower chamber back into the upper chamber. To this end, in particular embodiments, the valve is structured to close responsive to occurrence of a pressure differential between the lower and upper chambers tending to force gas in a direction opposite the airbag fill direction (i.e., in a direction form the second chamber into the first chamber. Closure of the valve in response to this pressure differential helps maintain a prolonged sustained pressure in the lower chamber.

Figure 2A:
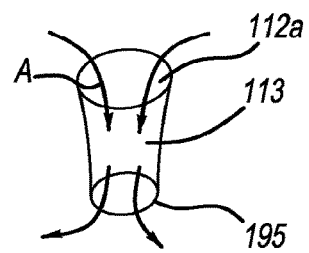
FIG. 2A is a perspective view of the valve embodiment of FIG. 2, showing the valve in an open condition.
Figure 2B:
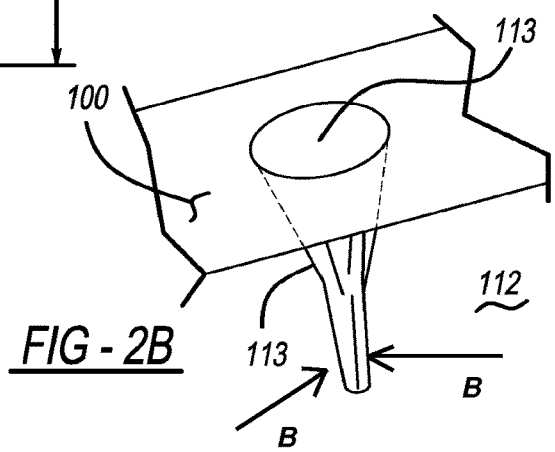
FIG. 2B is a perspective view of the valve embodiment of FIG. 2, showing the valve in a closed condition.
Figure 8:
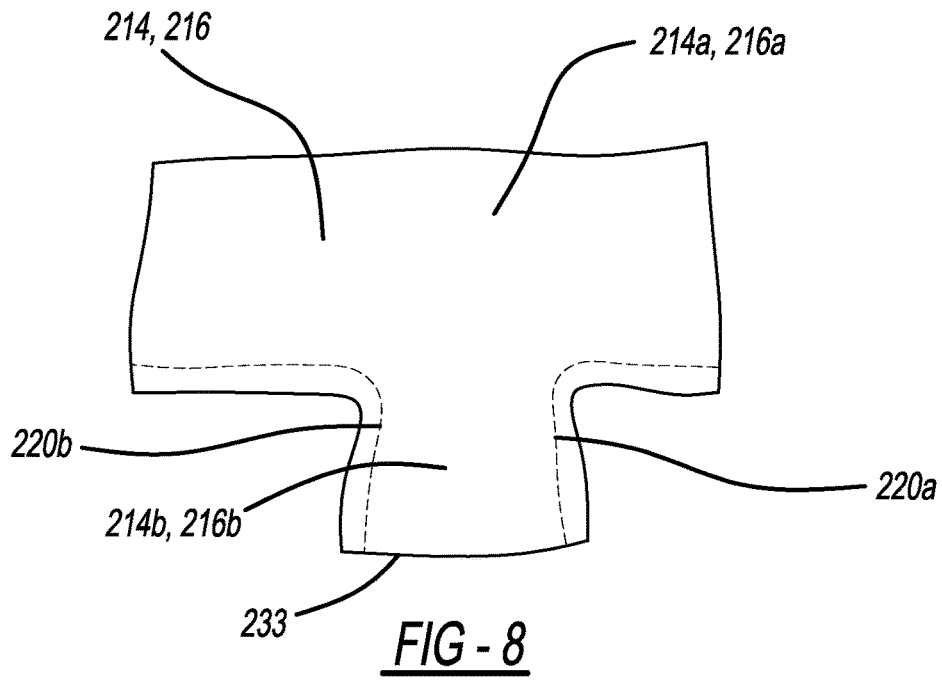
FIG. 8 is another side view of the divider and valve embodiment shown in FIG. 4A in an assembled condition.
Figure 9:
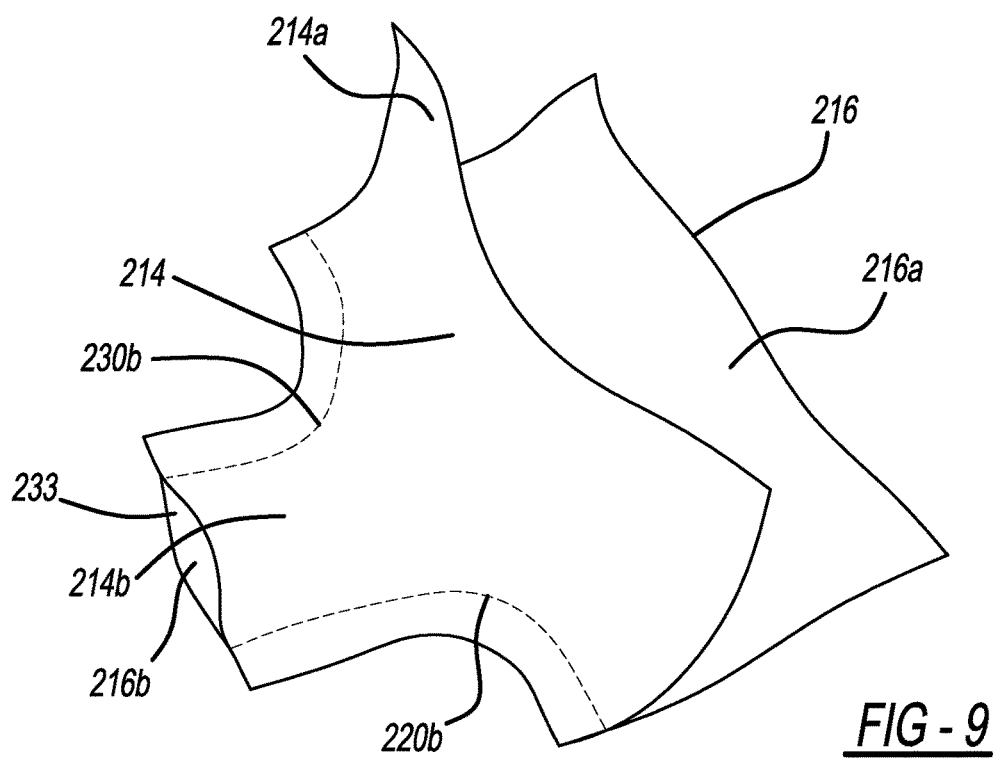
FIG. 9 is the side view of FIG. 8 showing a portion of the divider in a folded condition.
Figure 10:
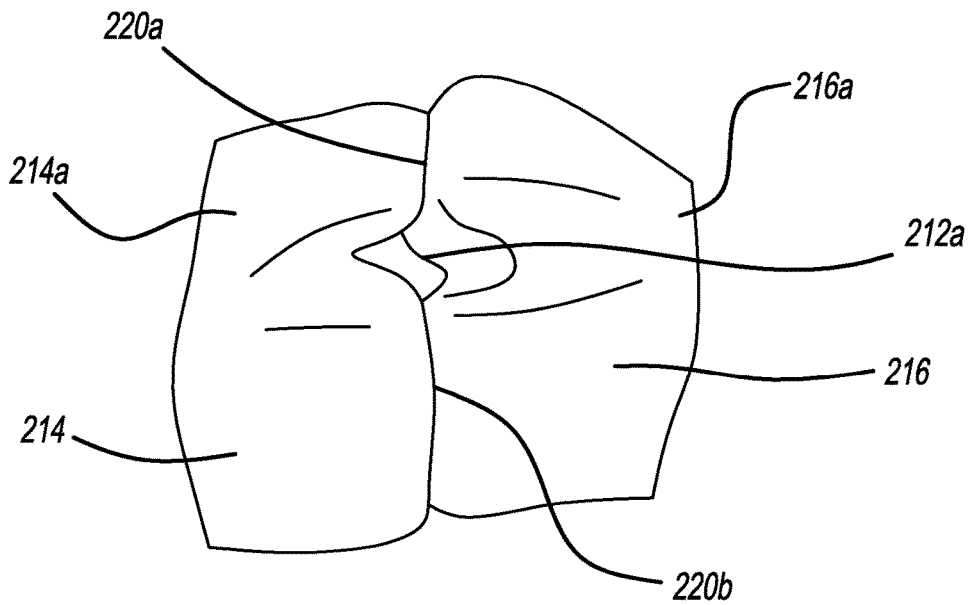
FIG. 10 is the view of FIG. 9 showing an opening in the divider enabling flow between upper and lower chambers of the airbag.

In the embodiment shown in FIGS. 2-2B, the valve mechanism includes an opening 112a provided to enable fluid communication between upper chamber 102 and lower chamber 104 (i.e., between the first and second sides of the divider). A first end 113a of a hollow member 113 of material configured in the shape of a tube or cylinder is stitched or otherwise suitably attached to divider 100 along a perimeter of opening 112a so as to enclose or surround the opening 112a and form a gas-tight seal between the member 113 and the body portion. Thus, any gases flowing from the upper chamber 102 through the opening 112a and into the lower chamber 104 flow through and along the hollow member 113 into the lower chamber via an opening 195 formed in a free or unattached second end 113b of the member. Member 113 is structured to open and to readily transfer gases from the upper chamber 102 to the lower chamber 104 responsive to a pressure differential wherein the upper chamber pressure is greater than the lower chamber pressure. FIG. 2A shows this embodiment of the valve in an open condition, with gases flowing along arrows "A" through the member 113 and into lower chamber 104, thereby expanding the tube structure and maintaining an open condition of the valve. In the embodiment shown, member 113 is generally cylindrical. However, the member 113 may have any cross-sectional shape suitable or desirable for a particular application. In one embodiment, member 113 is formed separately from the body portion 100p and later attached using any suitable method. Alternatively, member 113 may be formed integrally with the body portion, as a single piece.

In general, a reverse pressure differential is defined as a pressure differential urging gases in a direction from a second chamber back into a first chamber from which the gases were received into the second chamber. Member 113 is also structured to close so as to restrict a transfer gases from the lower chamber 104 back to the upper chamber 102 responsive to a reverse pressure differential wherein the lower chamber pressure is greater than the upper chamber pressure. To this end, a length L of member 113 extending from the divider is sized in relation to a diameter or other pertinent dimensions of opening 112a such that a higher relative gas pressure in lower chamber 104 pushes on the exterior surfaces of the member (as indicated by arrows B in FIG. 2B), causing the opposite walls of the member to collapse toward each other to contact each other, and causing the material of member 113 to fold and bunch inwardly, thereby closing the gas flow passage provided by the member in its open configuration and producing a closed condition of the valve restricting backflow of gases through the member and into chamber 102. This enables an elevated pressure to be maintained in the second chamber 104 for a prolonged period. The member also has sufficient length L in relation to the dimensions of opening 112a to ensure that the member walls collapse or close without the member being forced from the lower chamber side of the divider 100 through the opening 112a and into the upper chamber side of the divider by the driving reverse pressure differential. FIG. 2B shows this embodiment of the valve in a closed condition, responsive to a relatively higher pressure in lower chamber 104 than in upper chamber 102.

Specifying the dimensions of the member 113 and opening 112a as described herein also enables the member size to be optimized so as to minimize the amount of material used for the member, thereby minimizing the impact of member size on valve response time. The optimum dimensions for the valve member 113 and opening 112a may be determined analytically or by iteratively by experimentation, using known methods and testing.

In a particular embodiment, the dimension L is within the range of 20 mm to 50 mm, inclusive, for a circular divider opening 112a having a diameter in the range 5 mm to 10 mm, inclusive, when the divider is fully stretched or extended due to airbag inflation.

The pressure force with which the valve material closes the flow passage also increases as the pressure difference between the two chambers increases, so that the non-return valve remains closed, even at relatively high pressure differences between the chambers.

Member 113 may be formed from the same material as the divider 100 or any of the panels 12, 14, 16, or the member 113 may be formed from any other suitable gas-impermeable material or materials. Member 113 is also structured to be relatively pliable so that it can respond rapidly to pressure differentials between the upper and lower chambers as described above.

FIGS. 3-10 show another embodiment of the airbag chamber divider 200 and associated valve 212. In this embodiment, the divider and valve mechanism are formed from two generally "T"-shaped pieces 214 and 216 of gas-impermeable fabric(s) or other suitable gas-impermeable material(s). The top portion (214a for piece 214 and 216a for piece 216) of the "T" of each piece of material forms the divider body portion 200p and an attachment portion of the divider, while the trunk or bottom portion (214b for piece 214 and 216b for piece 216) of each piece of material forms a member 230 defining a gas flow passage and extending from the divider body portion 200p.

The pieces of material 214 and 216 are cut to the same dimensions and positioned adjacent each other so that their perimeter edges are aligned with each other as shown in FIG. 4B. The pieces 214 and 216 are then stitched or otherwise suitably attached to each other along a first seam 220a and a second seam 220b, so as to form gas-tight seals along the seams. As seen in FIG. 4B, each of first and second seams 220a and 220b extends along outer edges of the piece valve portions 214b and 216b, and also along bottom edges of the top portions 214a and 216a of the "T" extending from each side of the valve portions.

After attachment along the seams, the remaining, unattached top portions of the "T"'s may be separated and folded out or extended sideways as shown in FIGS. 3, 5 and 9-10 to form the divider body portion 200p. The un-stitched or unattached perimeters or edges 290 and 292 of these pieces may then be attached to the various panels 12, 14, and 16 forming the exterior of the airbag as previously described, so as to form gas-tight seals between the "T" top portions and the exterior panels. Attached in this manner to the airbag exterior panels, the connected top portions of the "T"'s combine to form a divider 200 similar to divider 100 previously described. Attachment of this divider 200 to the exterior panels forms an upper airbag chamber 102 and a lower chamber 104, as previously described. In addition, it is seen that the central, unattached portions of the fabric pieces 214 and 216 between the seams combine to form a generally "eye"-shaped valve opening 212a leading into a similarly-shaped enclosure 230 including a flow passage 231 defined by the connected "T" trunks or bottom portions 214b and 216b of the pieces 214 and 216. Flow passage 231 enables fluid communication between the upper chamber 102 and the lower chamber 104.

Operation of the valve 212 is substantially the same as operation of the valve 112 previously described with respect to FIGS. 1-2B. The gas flow rate from the upper chamber 102 into the lower chamber 104 may be controlled by controlling dimensions of opening 212a and the valve structure and dimensions. Similar to the previously described valve embodiment 112, the valve 212 is a one-way or non-return valve structured to restrict a return flow of gases from the lower chamber 104 back into the upper chamber 102. Further to this end, the valve is structured to close responsive to occurrence of a pressure differential between the lower and upper chambers tending to force gas in a direction opposite the airbag fill direction (i.e., in a direction form the second chamber into the first chamber), thus enabling maintenance of a prolonged sustained pressure in the lower chamber.

Any gases flowing from the upper chamber 102 through the opening 212a and into the lower chamber 104 flow through and along the passage 231, exiting through an opening 233 in the free or unattached end of the enclosure 230. Opening 233 is structured to open and to readily transfer gases from the upper chamber 102 to the lower chamber 104 responsive to a pressure differential wherein the upper chamber pressure is greater than the lower chamber pressure. FIG. 6 shows this embodiment of the valve in an open condition, with gases flowing along arrows "A" through the enclosure 230 and into lower chamber 104, thereby expanding the enclosure structure and maintaining an open condition of the valve.

Also, enclosure 230 is structured to close and to restrict a transfer gases from the lower chamber 104 back to the upper chamber 102 responsive to an airbag pressure differential wherein the lower chamber pressure is greater than the upper chamber pressure. To this end, a length L' of enclosure 230 is sized in relation to a cross-sectional area or other pertinent dimensions of opening 212a such that a higher relative gas pressure in lower chamber 104 pushes on the exterior surfaces of the enclosure, causing the walls of the enclosure to collapse toward each other to contact each other, and causing the material of enclosure 230 to fold and bunch inwardly, thereby closing the gas flow passage 231 provided by the enclosure in its open configuration and producing a closed condition of the valve restricting backflow of gases through the enclosure and into upper chamber 102. This enables an elevated pressure to be maintained in the second chamber 104 for a prolonged period.

The enclosure also has sufficient length L' in relation to the dimensions of opening 212a to ensure that the enclosure walls collapse toward each other or close without the enclosure being forced from the lower chamber side of the divider 200 through the opening 212a and into the upper chamber side of the divider by the driving pressure differential. FIG. 7 shows this embodiment of the valve in a closed condition, responsive to a relatively higher pressure in lower chamber 104 than in upper chamber 102.

Specifying the dimensions of the bottom portions 214b and 216b needed to provide a desired cross-sectional area and length L' of passage 231 also enables the enclosure size to be optimized so as to minimize the amount of material used for the enclosure, thereby minimizing the impact of enclosure size on valve response time. The optimum dimensions of the bottom portions 214b and 216b may be determined analytically or by iterative testing.

In one embodiment, the dimension L' is within the range of 20 mm to 50 mm, for a passage 231 having a cross-sectional area within the range 20 mm$^2$ to 30$^2$ mm inclusive, when the divider is fully stretched or extended due to airbag inflation.

The pressure force with which the valve material closes the flow passage also increases as the pressure difference between the two chambers increases, so that the non-return valve remains closed, even at relatively high pressure differences between the chambers.

In an alternative embodiment, the airbag chamber divider 200 and valve 212 are formed from a single continuous piece of material, instead of from two separate sheets.

Referring to FIGS. 11-17, in another embodiment, a divider 300 has a body portion 300p with attachment portions 310 and non-attachment portions 313 and 315 formed therewith. Attachment portions 310 are attached to the panels 12, 14 and 16 forming an exterior or outer shell of the airbag so as to form gas tight seals between the divider and the panels, as previously described. Non-attachment portions 313 and 315 are unattached to any of panels 12, 14 and 16, so that openings 320 and 322 enabling fluid communication between the upper and lower chambers 102 and 104 are provided between the non-attachment portions 313 and 315 and the portions of the panels 12, 14 and 16 opposite the non-attachment portions 313 and 315.

In addition, valve mechanisms 312 and 321 (shown schematically in FIGS. 11-12B) are provided to permit gas to flow from the upper chamber into the lower chamber, and also to restrict backflow from the lower chamber 104 into the upper chamber 102. The gas flow rate from the upper chamber 102 into the lower chamber 104 may be controlled by controlling the dimensions of openings 320 and 322 and the valve structure and dimensions. In the embodiments described herein, the valves are one-way or non-return valves structured to restrict a return flow of gases from the lower chamber back into the upper chamber. Further to this end, in particular embodiments, the valves are structured to close responsive to occurrence of a reverse pressure differential between the lower and upper chambers tending to force gas in a direction opposite the airbag fill direction (i.e., in a direction from the second chamber into the first chamber), thus enabling maintenance of a prolonged sustained pressure in the lower chamber.

Figure 11:
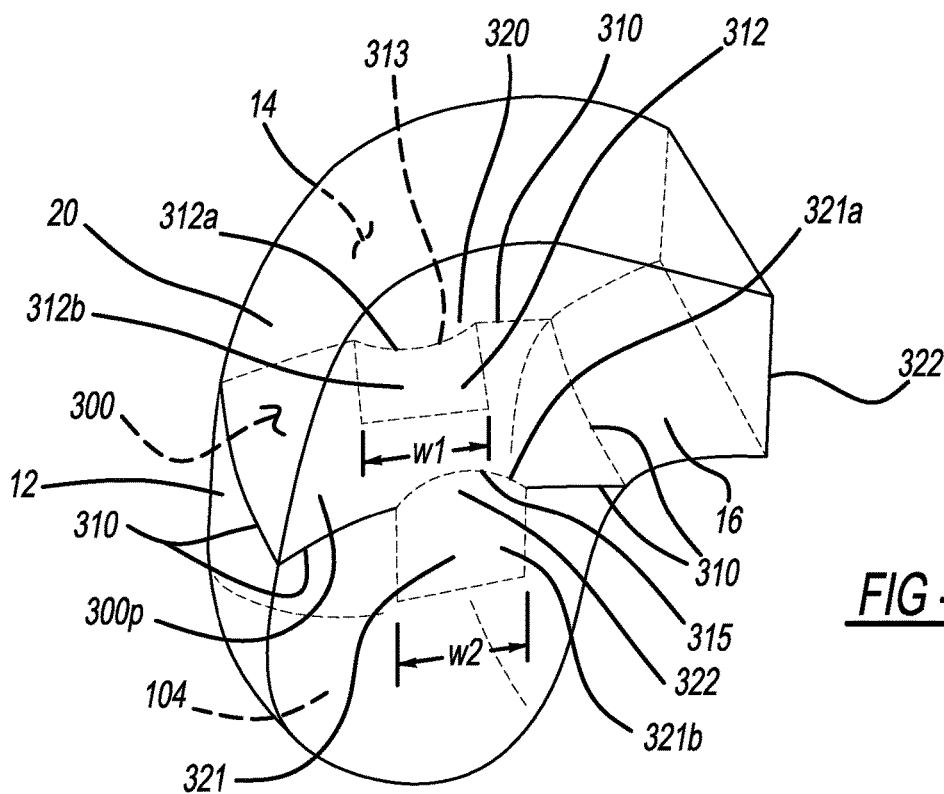
FIG. 11 is a schematic perspective view of a passenger-side airbag (in an inflated state) incorporating an airbag divider and multiple flow control valves in accordance with an alternative embodiment described herein.
Figure 12A:
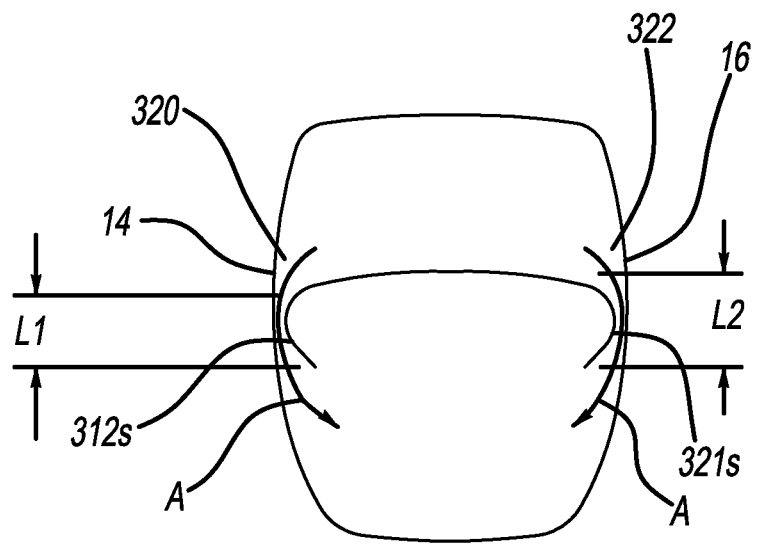
FIG. 12A is a front schematic view of the embodiment shown in FIG. 11 showing the valves in an open condition.
Figure 12B:
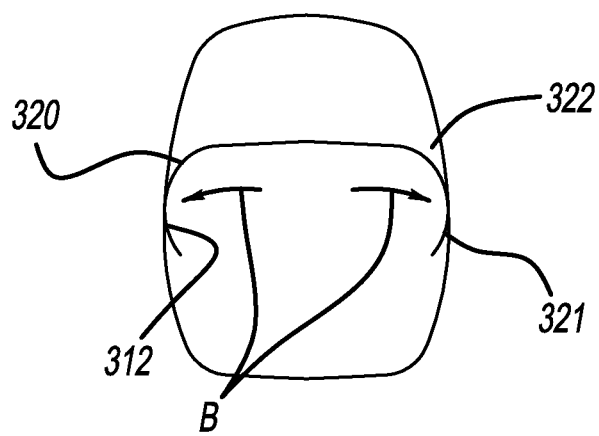
FIG. 12B is a front schematic view of the embodiment shown in FIG. 11 showing the valves in a closed condition.
Figure 12C:
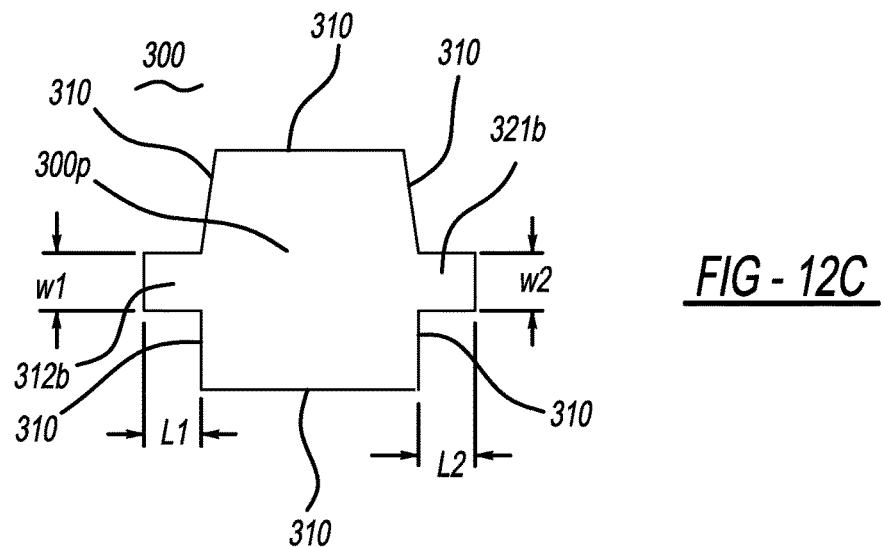
FIG. 12C is a plan view of the divider incorporated into the airbag embodiment of FIGS. 11-12B, in a flattened or extended state.

Referring to FIGS. 11-12C, in one embodiment, a first end 312a of a flap 312b of material is formed integrally with or stitched or otherwise suitably attached to body portion 300p along a peripheral edge of divider non-attachment portion 313 forming one side of the opening 320, so as to form a gas-tight seal between the flap and the body portion. Also, a first end 321a of a flap 321b of material is formed integrally with or stitched or otherwise suitably attached to divider 300 along an edge of non-attachment portion 315 forming one side of the opening 322, so as to form a gas-tight seal between the flap and the body portion. In the embodiment shown, flaps 312b and 321b are rectangular, although other shapes may be used according to the requirements of a particular application. Flap 312b has a length L1 and a width w1. Flap 321b has a length L2 and a width w2. FIG. 12C shows a plan view of divider 300 of FIGS. 11-12B in a flattened or extended state with flaps 312b and 321b attached as described.

When the divider 300 is attached to the panels forming the airbag outer shell along attachment portions 310, any gases flowing from the upper chamber 102 through the openings 320 and 322 into the lower chamber 104 will flow through the opening 320 bounded by the flap 312b on one side and the airbag panel 14 on the other side, and through the opening 322 bounded by flap 321b on one side and the airbag panel 16 on the other side. These gases will flow along the flaps 312b and 321b attached to the openings, responsive to a pressure differential wherein the upper chamber pressure is greater than the lower chamber pressure.

FIG. 12A schematically shows an embodiment of the valves 312 and 321 in an open condition, with gases flowing along arrows "A" through the openings 320 and 322 and into lower chamber 104, thereby pushing aside the flaps 312b and 321b and maintaining an open condition of the valve. Also, flaps 312b and 321b are structured to close and to restrict a transfer gases from the lower chamber 104 back to the upper chamber 102 responsive to an airbag pressure differential wherein the lower chamber pressure is greater than the upper chamber pressure. To this end, the lengths L1 and L2 of flaps 312b and 321b, respectively, are sized in relation to pertinent dimensions of the respective openings 320 and 322 to which they are coupled, such that a higher relative gas pressure in lower chamber 104 pushes on the interior surfaces 312s and 321s of the flaps, causing the flaps 312b and 321b to move toward their respective openings 320 and 322 and also toward respective ones of exterior panels 12, 14 and 16 of the airbag, until contact is made between the flaps and the exterior walls of the airbag. This contact forms a gas-tight seal at each of openings 320 and 322 which restricts backflow from the lower chamber 104 into the upper chamber 102. This enables an elevated pressure to be maintained in the second chamber 104 for a prolonged period.

The flaps 312 and 321 also have sufficient lengths L1 and L2, respectively, in relation to the dimensions of their respective openings 320 and 322 to ensure that the flaps contact the divider and walls as described without the flaps being forced through their respective openings and into the upper chamber side 102 of the divider 300 by the driving pressure differential. FIG. 12B shows this embodiment of the valves in a closed condition, responsive to a relatively higher pressure in lower chamber 104 than in upper chamber 102, with the higher gas pressure exerting forces represented by arrow "B" on the interior surfaces of the panels 312b and 321b.

Specifying the dimensions of the flaps 312 and 321 as described herein also enables the flap sizes to be optimized so as to minimize the amount of material used for the flaps, thereby minimizing the impact of flap size on valve response time. The optimum dimensions for the valve flap may be determined analytically or by iterative testing.

In one embodiment, the dimensions L1 and L2 in FIG. 12A are within the range of 20 mm to 50 mm for openings 320 and 322 each having a cross-sectional area in the range 20 $mm^2$ to 30 $mm^2$, inclusive, when the divider is fully stretched or extended due to airbag inflation.

The pressure force with which the valve material closes the flow passages also increases as the pressure difference between the two chambers increases, so that the non-return valves remain closed, even at relatively high pressure differences between the chambers.

Flaps 312b and 321b may be formed from the same material as the body portion 300p or any of the panels 12, 14, 16, or the flaps may be formed from any other suitable gas-impermeable material or materials. Flaps 312 and 321 are also structured to be relatively pliable so that they can respond rapidly to pressure differentials between the upper and lower chambers as described above.

Figure 14:
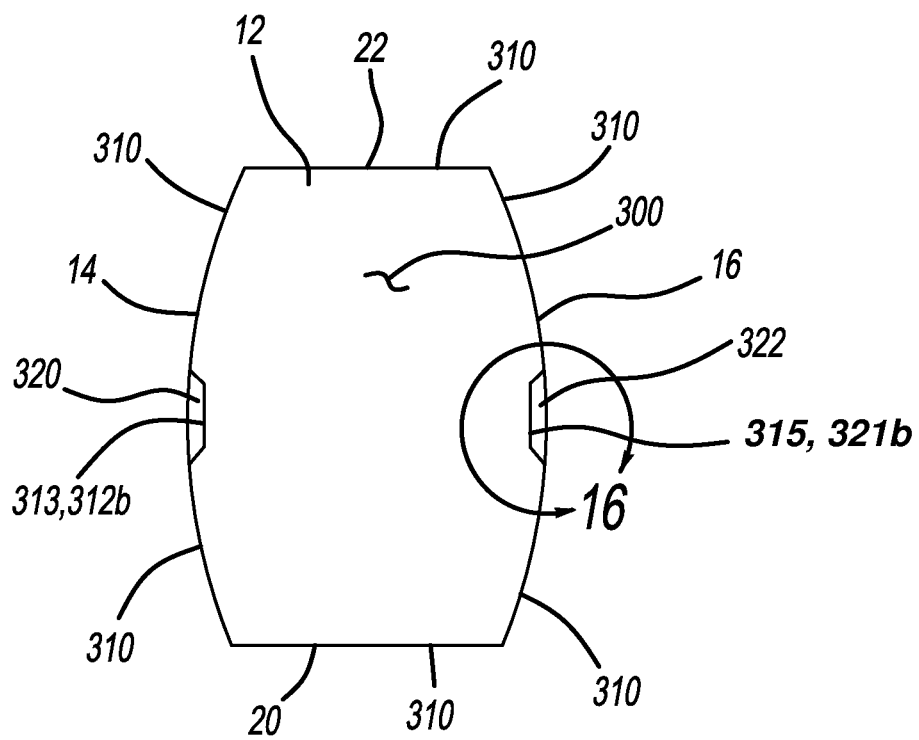
FIG. 14 shows a plan cross-sectional view of the embodiment shown in FIGS. 11-12B.

FIG. 14 shows a plan cross-sectional view of the embodiment shown in FIGS. 11-12B.

Figure 15:
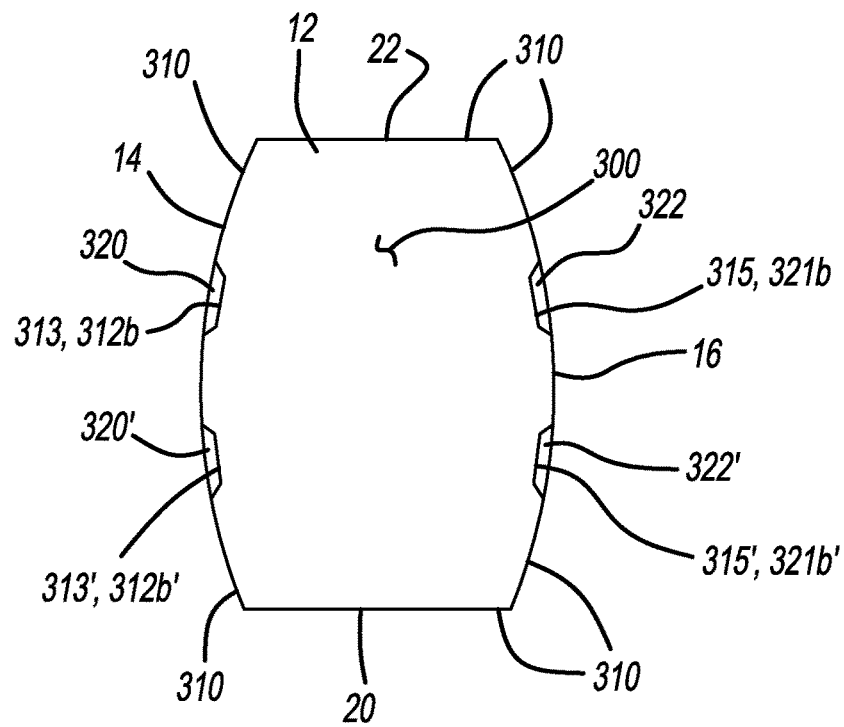
FIG. 15 is a plan cross-sectional view of a passenger-side airbag (in an inflated state) incorporating an airbag divider and multiple flow control valves in accordance with another alternative embodiment described herein.
Figure 15A:
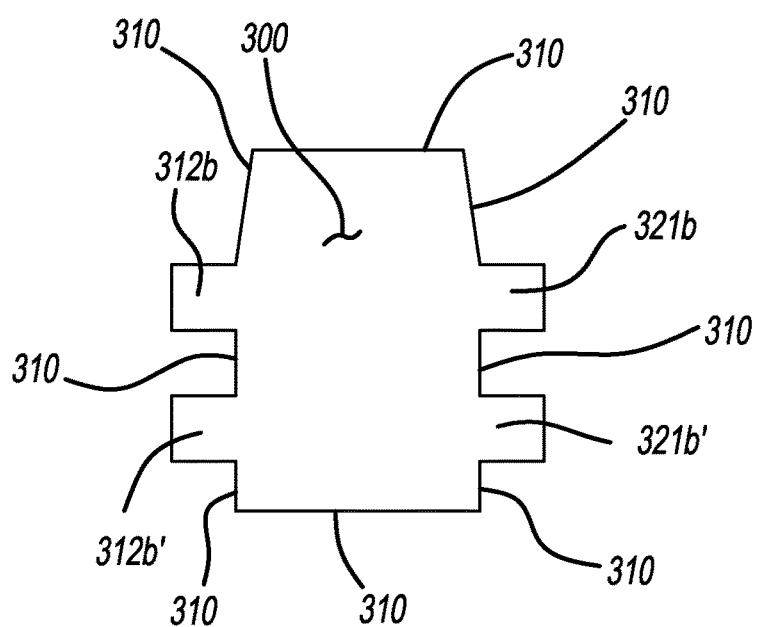
FIG. 15A is a plan view of the divider incorporated into the airbag embodiment of FIG. 15, in a flattened or extended state.

FIG. 15 shows a plan view of another embodiment similar to the embodiment shown in FIG. 14. In FIG. 15, multiple openings 320, 320', 322 and 322' are formed along the side edges of divider 300, and each opening is provided with an associated non-return valve as just described. FIG. 15A shows a plan view of the divider 300 of FIG. 15 in a flattened or extended state. FIG. 16 is a magnified view of a portion of the cross-section shown in FIG. 14, with the valve shown in an open condition.

Figure 13:
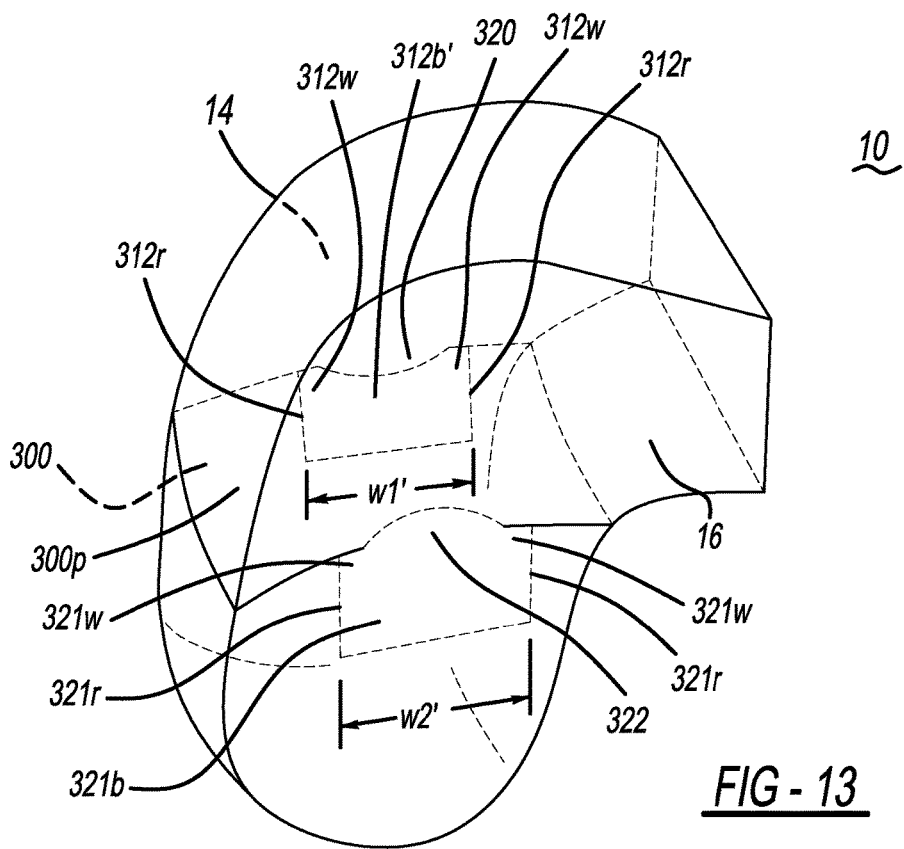
FIG. 13 is a schematic perspective view of a passenger-side airbag (in an inflated state) incorporating an airbag divider and multiple flow control valves in accordance with another alternative embodiment described herein.
Figure 13A:
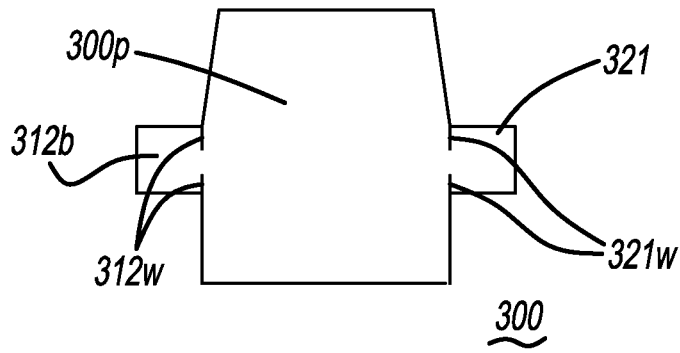
FIG. 13A is a plan view of the divider incorporated into the airbag embodiment of FIG. 13, in a flattened or extended state, and also showing portions divider flaps to be attached to the airbag outer shell.

Referring to FIGS. 13 and 13A, in a particular embodiment, rectangular flaps 312b' and 321b' similar to those shown in FIG. 11 have respective widths w1' and w2' dimensioned so as to provide side portions 312w and 321w, respectively, which extend past or overlap each end of openings 320 and 322 when the divider is attached to the panels forming the airbag outer shell. That is, flap 312b' is directly attached to side panel 14 along portions of the flap width dimension w1' so as to provide attached portions 312w of the flap 312b', and so as to form a gas-tight seal between the outer shell and each attached flap portion. These attached flap portions overlap or extend past the ends of opening 320 when the divider body portion 300p and the flap portions 312w are attached to the panels forming the airbag outer shell. In addition, flap 321b' is attached to side panel 16 along portions of the flap width dimension w2' so as to provide attached portions 321w of the flap 321b'. These attached flap portions overlap or extend past the ends of opening 322 when the divider body portion 300p and the flap portions 321w are attached to the panels forming the airbag outer shell. The lengths of the flap attached portions 312w and 321w may be specified according to the requirements of a particular application. FIG. 13A shows a plan view of divider 300 of FIG. 13 in a flattened or extended state with flaps 312b and 321b attached as described, and also showing the portions 312w and 321w of the flaps that are attached to associated ones of airbag panels 14 and 16 so that these portions of the flaps overlap the ends of openings 320 and 322.

The overlap or additional material provided by the extended side portions of the flap 312b aids in preventing opposite side edges 312r of flap 312b from being forced through opening 320 or into contact with associated edges of the opening responsive to a pressure differential between the lower and upper chambers tending to force gas from the lower chamber 104 toward the upper chamber 102. Also, the overlap provided by the extended side portions of the flap 321b aids in preventing opposite side edges 321r of the flap 321b' from being forced through opening 322 or into contact with associated edges of the opening responsive to a pressure differential between the lower and upper chambers tending to force gas from the lower chamber 104 toward the upper chamber 102.

In another particular embodiment shown in FIG. 17, a valve 312 as previously described is shown in a closed condition, as seen in FIG. 12B. However, one or both of the surface of flap 312b contacting the airbag panel 14 and the interior surface of the airbag panel 14 contacting the flap 312b are coated with a layer 800 of silicone or a similar material to aid in forming and retaining a gas-tight seal between the contacting surfaces of the flap and the airbag side panel.

Referring to FIG. 18, in another particular embodiment, an airbag 510 includes a divider 500 and at least one opening 512a and an associated non-return valve 555 in accordance with an embodiment described herein. The divider 500 is attached to the inner surfaces of the airbag panels 512, 514, 516 so as to form a curved or undulating surface 500s with alternating adjacent flat portions extending in various directions and terminating in a downwardly-extending leading edge 500e connected to airbag front side 520, with the non-return valve(s) (not shown) positioned in desired location(s) along the divider. However, the seams connecting the divider 500 to the main and side airbag panels may have any locations and/or configurations necessary for the requirements of a particular application. For efficient operation of the valve embodiment previously described, it is desirable that the valve opening 112a and the seams attaching the flap to the divider be located along a relatively flat portion of the divider. The design parameters of the valve(s) and the shape of the divider 500 as attached to the airbag panels 512, 514, 516 may be optimized so as to inflate one or more portions of the airbag prior to other portions of the airbag and/or to deflect or otherwise respond in a desired manner to the impact of various portions of a vehicle passenger on the airbag exterior.

Figure 19:
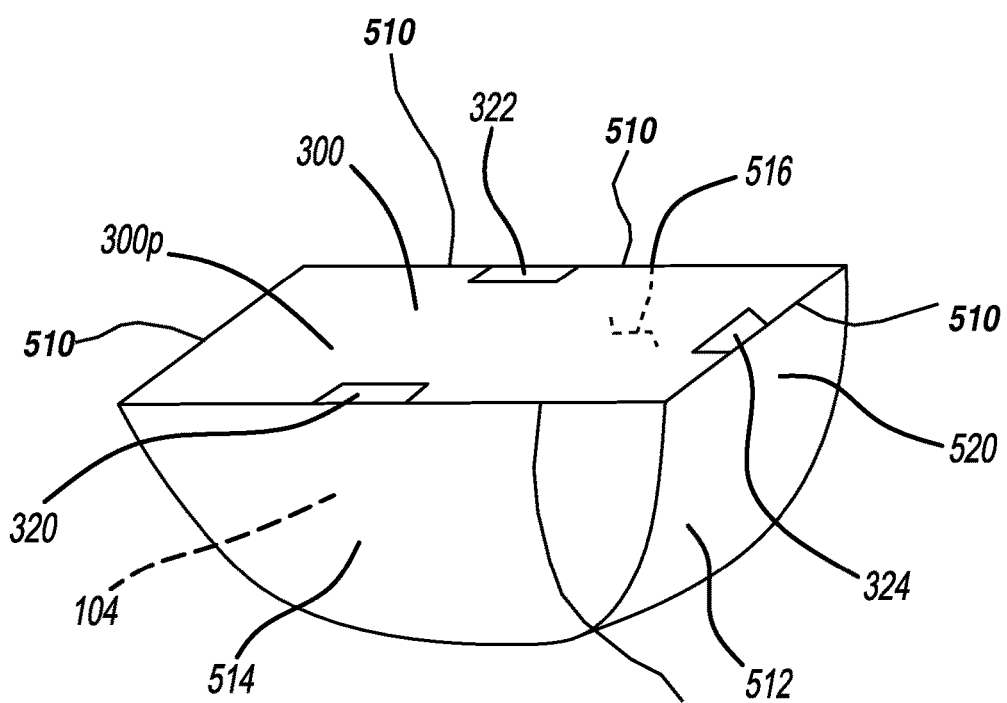
FIG. 19 is a schematic cross-sectional view of portion of a passenger-side airbag (in an inflated state) incorporating an airbag divider and multiple flow control valves in accordance with another alternative embodiment described herein.

FIG. 19 shows a cross-sectional perspective view of another airbag embodiment, showing the portion of the airbag along and below the divider 300. In this embodiment, the divider 300 is attached along attachment portions 510 to panels 512, 514 and 516 forming an exterior or outer shell of the airbag so as to form gas tight seals between the divider and the panels, as previously described. Divider 300 has a body portion 300p and including side openings 320 and 322 as previously described with respect to FIGS. 11-14. In addition, another opening 324 is formed in between the divider and the main airbag panel 512, opposite a front impact side 520 of the airbag. The opening 324 also has a non-return valve in accordance with one of the embodiments described herein operatively coupled to the opening.

Figure 19A:
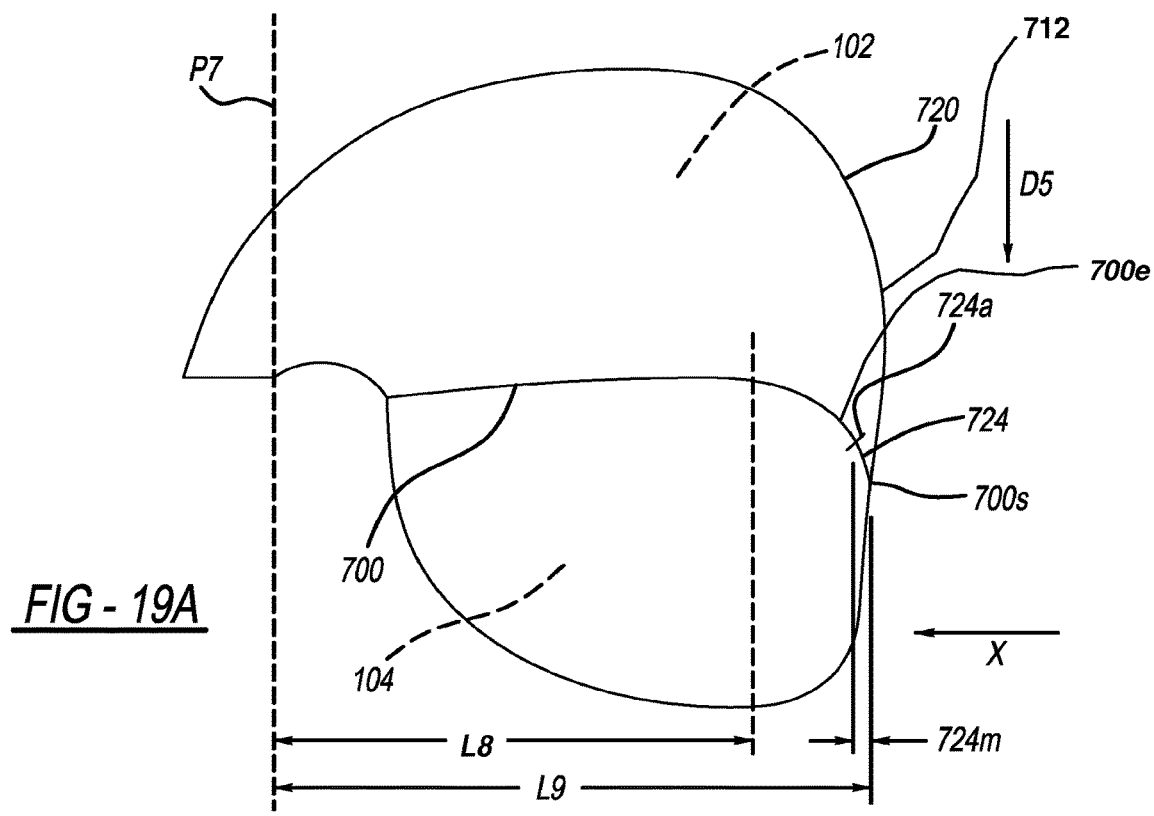
FIG. 19A is a schematic cross-sectional view of portion of a passenger-side airbag (in an inflated state) incorporating an airbag divider in accordance with another alternative embodiment described herein.

FIG. 19A is a schematic cross-sectional view of portion of a passenger-side airbag (in an inflated state) incorporating an airbag divider in accordance with another alternative embodiment. Referring to FIG. 19A, a divider 700 is attached along attachment portions 710 to panels 712, 714 and 716 forming an exterior or outer shell of the airbag so as to form gas tight seals between the divider and the panels, as previously described. In this embodiment, a portion 700e of the divider attached to and adjacent the front panel is sloped or oriented at an angle with respect to a plane of the front panel. In the particular embodiment shown in FIG. 19A, a portion 700e of the divider 700 adjacent the front panel 712 slopes or angles in a downward direction D5 (from the perspective of a vehicle occupant seated adjacent the front panel) when the airbag is in an inflated condition. However, the divider portion 700e may alternatively slope or angle in an upward direction (opposite the direction D5).

In a particular embodiment, the slope or change in direction of orientation of the divider portion 700e commences at location L8 which is two-thirds of the distance L9 from the location on the airbag at which the bag is attached (or structured to be attached) to the vehicle for receiving inflation gas therein (denoted by plane P7 in FIG. 18A), to the seam 700s attaching the divider 700 to the front panel 712 and to the front impact side 720 of the airbag, at a location where an occupant will contact the front panel. In addition, an opening 724 similar to opening 324 shown in FIG. 19 is located between the divider and the main airbag panel 712, opposite the front impact side 720 of the airbag.

During inflation of the airbag, inflation gases flow into chamber 102, then from chamber 102 through opening 724 into chamber 104. The degree of slope of divider portion 700e and the dimensions of the opening 724 (and particularly the dimension of the opening extending in the direction toward plane P7) are specified such that the opening shrinks and then closes responsive to a vehicle occupant contacting the airbag front panel 712. That is, the pressure exerted in direction X by occupant contact pushes the front panel 712 toward a forward-most edge 724a of the opening while at the same time forcing seam 700s in direction X , thereby reducing the effective width 724m of the opening 724 through which gases can flow and restricting gas flow through the opening 724. In the embodiment shown, the effective width 724m is measured as a horizontal distance from the seam 700s to the edge 724a. With sufficient occupant contact pressure, contact surface 720 and seam 700s are forced further in direction X until the front panel 712 contacts the opening edge 724s the airbag fill direction.

Figure 19B:
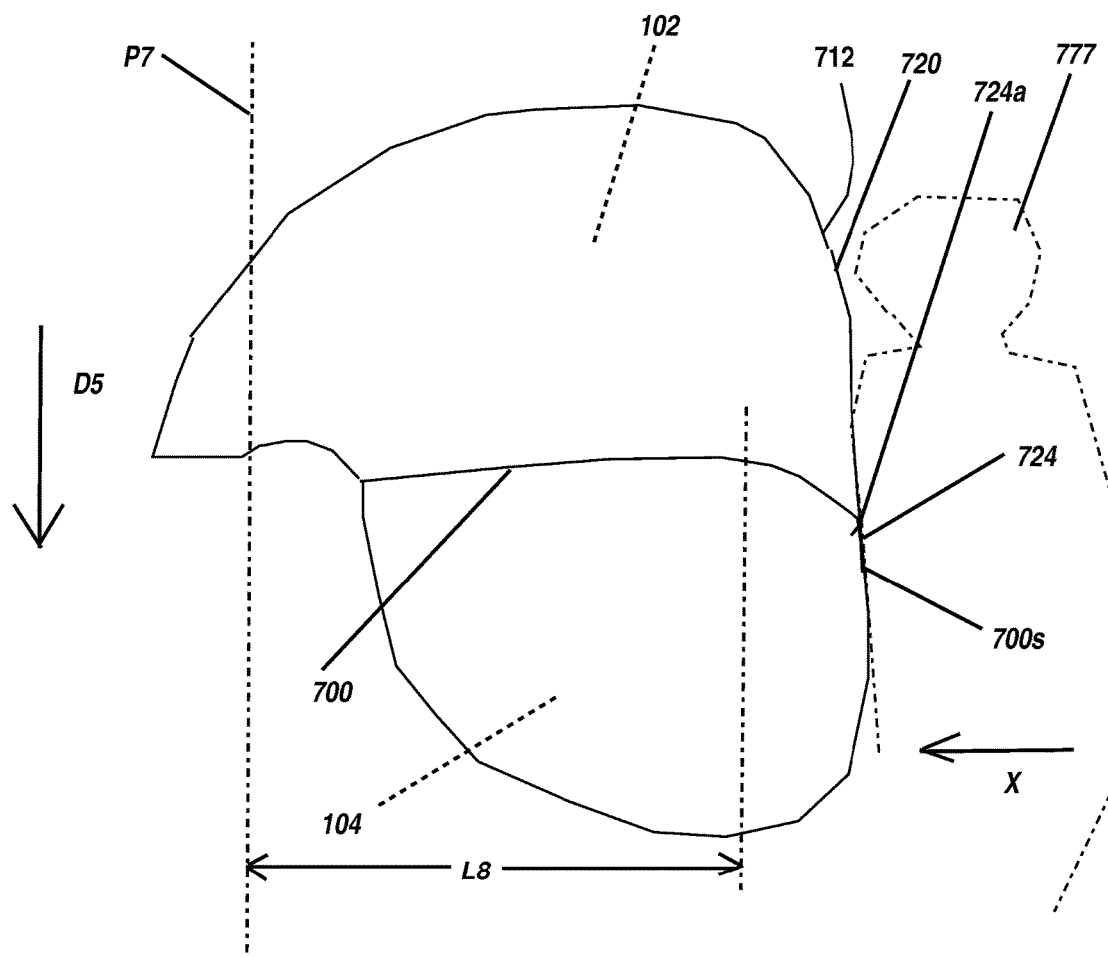
FIG. 19B is the schematic cross-sectional view of FIG. 19A showing a divider opening in a closed condition responsive to contact of an occupant with the airbag.

FIG. 19B shows the embodiment of FIG. 19A where the opening 724 is in a closed condition, in response to contact of an occupant 777 with the airbag. Thus, the size of the opening is reduced and then the opening is closed in direct response to the occupant contacting the airbag. This embodiment obviates the need for a flap to close the opening responsive to the reverse pressure differential, as long as the occupant maintains pressure against the front panel. The optimum degree of downward slope of divider portion 700e and the dimensions of the opening 724 for a particular application may be determined analytically or by iteratively by experimentation, using known methods and testing.

In alternative embodiments, the sloped divider portion 700e and associated opening 724 may be used in conjunction with other openings and valve mechanisms (not shown) formed in the divider to enable and restrict flow between chambers 102 and 104.

In the embodiments described herein, any number of one-way valves of any desired type (or types) may be incorporated into an associated divider in any suitable location(s), according to the requirements of a particular application, such as the desired fill time of the airbag, the location(s) (if any) inside the airbag that are to be filled prior to the filling of other locations, and other pertinent factors.

Figure 20:
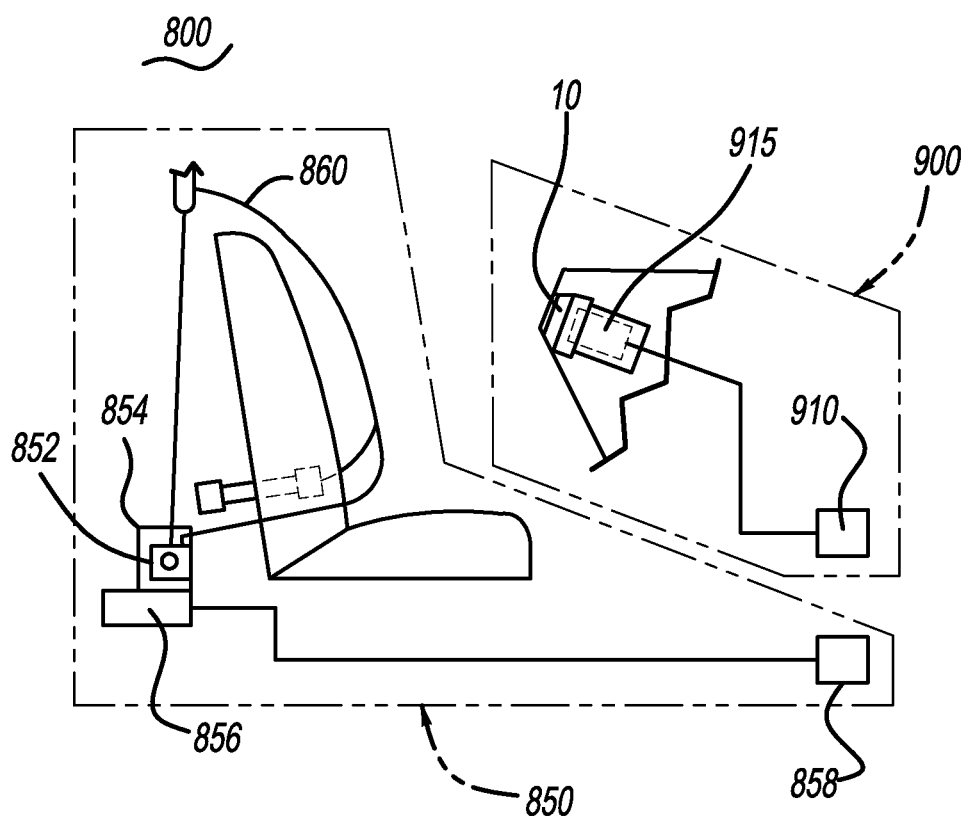
FIG. 20 is a view of a vehicle occupant protection system incorporating an airbag in accordance with an embodiment of the present invention.

Referring now to FIG. 20, an embodiment 10 of the airbag described herein may be incorporated into an airbag system 900. Airbag system 900 includes at least one gas source 915 (for example, a known inflator or gas generating system) and airbag 10 in accordance with an embodiment described herein. The airbag is operatively coupled to the gas source so as to enable fluid communication therewith upon activation of the gas generating system. Airbag system 900 may also include (or be in communication with) a collision event sensor 910. Collision event sensor 910 includes a known collision sensor algorithm that prompts actuation of airbag system 900 via, for example, activation of gas source 915 in the event of a collision.

Referring again to FIG. 20, airbag system 900 may also be incorporated into a broader, more comprehensive vehicle occupant protection system 800 including additional elements such as a safety belt assembly 850. FIG. 20 shows a schematic diagram of one exemplary embodiment of such a protection system. Safety belt assembly 850 includes a safety belt housing 852 and a safety belt 860 extending from housing 852. A safety belt retractor mechanism 854 (for example, a spring-loaded mechanism) may be coupled to an end portion of the belt. In addition, a known safety belt pretensioner 856 may be coupled to belt retractor mechanism 854 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt assembly 850 may also include (or be in communication with) a collision event sensor 858 (for example, an inertia sensor or an accelerometer) including a known collision sensor algorithm that prompts actuation of belt pretensioner 856 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

References herein to the positions or orientations of elements, for example "upper", "lower", etc., refer to characteristics of an inflated airbag when mounted in a vehicle. It should be noted that the orientation of various elements may differ according to other exemplary embodiments, and that such variations are intended to be encompassed by the present disclosure.

It is noted that airbags having the same exterior dimensions and structure may be used for multiple applications, because variations in airbag performance characteristics due to design requirements may be achieved by modifying the interior structure of the airbag (for example, by changing the location of the divider, by modifying the flow characteristics of the various valve embodiments connecting the upper and lower chambers, and by changing the upper chamber vent locations and characteristics). This ability to use a common exterior structure provides a degree of uniformity in bag design and manufacturing.

It will be understood that the foregoing descriptions of the various embodiments are for illustrative purposes only. As such, the various structural and operational features herein disclosed are susceptible to a number of modifications, none of which departs from the scope of the appended claims.

What is claimed is:

1. An airbag comprising:
    an outer shell defining an interior of the airbag; and
    a divider positioned in the interior so as to divide the interior into an upper chamber and a lower chamber upon actuation of the airbag, the divider including a body portion and at least one flap attached to the body portion along an edge of the divider, the divider being attached to the outer shell so as to form a gas-tight seal between the outer shell and the body portion and so as to form a gas flow passage between the at least one flap and the outer shell,
    wherein the divider slopes in a downward direction starting from a first location which is two-thirds of a distance from a location on the airbag at which the airbag is structured for attachment to a vehicle for receiving inflation gas therein, and proceeding toward a second location at which the divider is attached to the outer shell of the airbag, and
    wherein said upper chamber is structured to be juxtaposed to a head and thorax of an occupant and said lower chamber is structured to be juxtaposed to the thorax of the occupant when said airbag is fully inflated.

2. A vehicle occupant protection system including an airbag in accordance with claim 1.

3. The airbag of claim 1 wherein the airbag when inflated contacts the vehicle occupant along both an exterior of a portion of the outer shell defining the upper chamber and along an exterior of a portion of the outer shell defining the lower chamber, to cushion an impact of the vehicle occupant.

4. The airbag of claim 1 wherein a portion of the at least one flap is directly attached to the outer shell so as to form a gas-tight seal between the outer shell and the attached flap portion, and wherein the at least one flap portion is structured to extend past an end of the gas flow passage when the divider body portion and the portion of the at least one flap are attached to the airbag outer shell.

5. The airbag of claim 1 wherein the divider is attached to the outer shell along a front impact side of the airbag, and wherein the airbag is structured to contact the vehicle occupant along the attachment between the divider and the front impact side, to cushion an impact of the vehicle occupant.

6. The airbag of claim 1 wherein the body portion includes a plurality of flaps, each flap being attached to the body portion along an associated edge thereof, and wherein the divider is attached to the outer shell so as to form a gas-tight seal between the outer shell and the body portion and so as to form an associated gas flow passage between the outer shell an said each flap of the plurality of flaps.

7. The airbag of claim 6 wherein the divider is attached to the outer shell so as to form a gas flow passage between a first flap of the plurality of flaps and a portion of the outer shell forming a left side of the airbag, and so as to form a gas flow passage between a second flap of the plurality of flaps and a portion of the outer shell forming a right side of the airbag.

8. An airbag comprising:
    an outer shell defining an interior of the airbag, the outer shell defining a mouth of the airbag positioned in a first chamber and through which gas is injected into the airbag;
    a divider positioned in the interior so as to divide the interior into the first chamber and a second chamber, the divider including a body portion and at least one flap attached to the body portion along an edge, the divider being attached to the outer shell so as to form a gas-tight seal between the outer shell and the body portion and so as to form a gas flow passage between the at least one flap and the outer shell, the at least one flap being structured to restrict gas flow from the second chamber through the passage and into the first chamber; and
    at least one vent positioned in the first chamber and structured to release the gas from the first chamber to an exterior of the airbag,
    wherein the divider slopes in a downward direction starting from a first location which is two-thirds of a distance from a location on the airbag at which the airbag is structured for attachment to a vehicle for receiving inflation gas therein, and proceeding toward a second location at which the divider is attached to the outer shell of the airbag, and
    wherein upon actuation of the airbag said first chamber is adapted to communicate with a head and a thorax of an occupant of an associated vehicle, and, said second chamber is adapted to communicate only with a thorax of an occupant of an associated vehicle.

9. The airbag of claim 8 wherein the first chamber is an upper chamber of the airbag, and the second chamber is a lower chamber of the airbag.

10. A vehicle occupant protection system including an airbag in accordance with claim 8.

11. An airbag comprising:
    an outer shell defining an interior of the airbag; and
    a divider positioned in the interior so as to divide the interior into a first chamber and a second chamber, a portion of the divider being attached to the outer shell, the portion of the divider including an opening adjacent the outer shell, the portion of the divider being oriented with respect to the outer shell such that movement of a portion of the outer shell in a direction toward the airbag interior causes the outer shell to contact the divider adjacent edges of the opening so as to overlap and cover the opening, so as to restrict a flow of gases between the first and second chambers wherein the airbag is structured such that the divider slopes in a downward direction starting from a first location which is two-thirds of a distance from a location on the airbag at which the bag is structured for attachment to a vehicle for receiving inflation gas therein, and proceeding toward a second location at which the divider is attached to the outer shell of the airbag.

12. The airbag of claim 11 wherein the airbag is structured such that the portion of the divider slopes in the downward direction when the airbag is in an inflated condition.

13. A vehicle occupant protection system including an airbag in accordance with claim 11.

14. An airbag comprising:
an outer shell defining an interior of the airbag; and
a divider positioned in the interior so as to divide the interior into an upper chamber and a lower chamber, the divider including a body portion and at least one flap attached to the body portion along an edge of the divider, the divider being attached to the outer shell so as to form a gas-tight seal between the outer shell and the body portion and so as to form a gas flow passage between the at least one flap and the outer shell,
wherein a portion of the at least one flap is directly attached to the outer shell so as to form a gas-tight seal between the outer shell and the attached flap portion, and wherein the portion of the at least one flap is structured to extend past an end of the gas flow passage when the divider body portion and the portion of the at least one flap are attached to the airbag outer shell.

\* \* \* \* \*